Sept. 22, 1925.
M. J. TRUMBLE
GAS TRAP VALVE
Filed Oct. 24, 1921
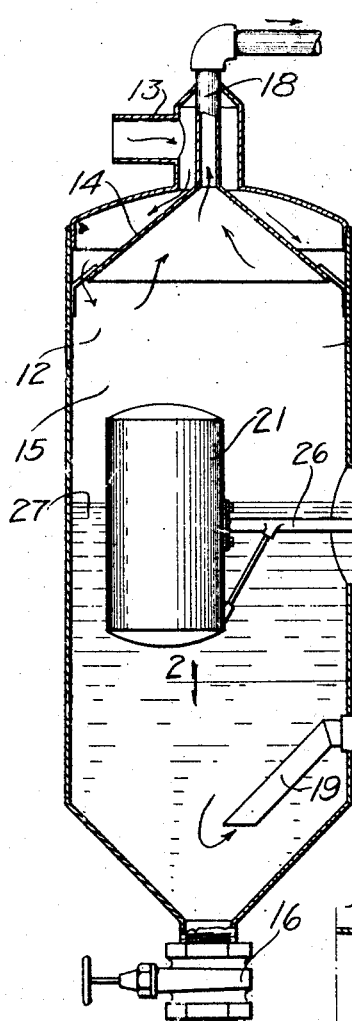
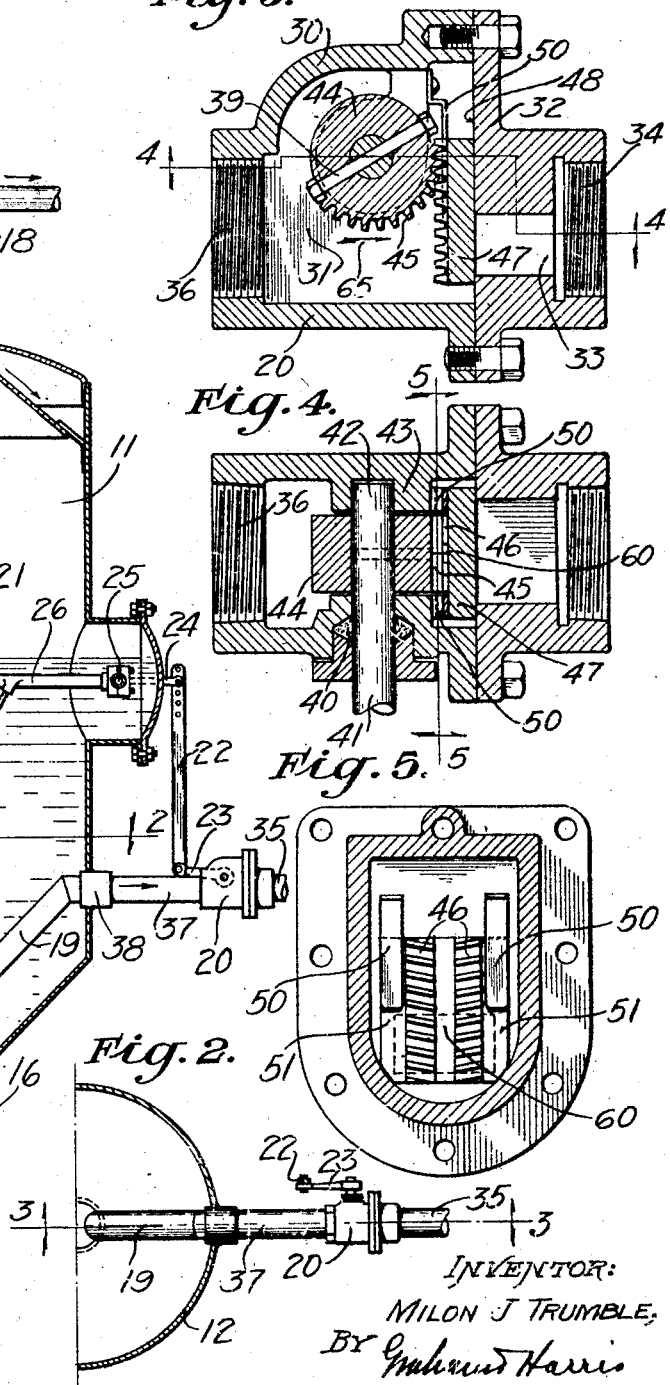
INVENTOR:
MILON J TRUMBLE,
BY
ATTORNEYS.

Patented Sept. 22, 1925.

1,554,311

UNITED STATES PATENT OFFICE.

MILON J. TRUMBLE, OF ALHAMBRA, CALIFORNIA.

GAS-TRAP VALVE.

Application filed October 24, 1921. Serial No. 509,884.

*To all whom it may concern:*

Be it known that I, MILON J. TRUMBLE, a citizen of the United States, residing at Alhambra, in the county of Los Angeles and State of California, have invented a new and useful Gas-Trap Valve, of which the following is a specification.

This invention relates to flow regulating devices and relates particularly to means for controlling the flow of oil from gas traps and related apparatus.

It is an object of my invention to provide a valve which will not be materially affected in operation by the presence of sand in the oil flowing therethrough.

It is a further object of my invention to provide a valve of this type which will maintain a substantially tight closure proportionately to the pressure of the oil operating thereagainst.

It is a further object of my invention to provide in this valve such an arrangement of parts that the wear caused by sand carried in the oil will be confined to the renewable parts.

It is a further object of my invention to provide a valve of this type which is extremely simple and economical in construction and in which the wearing parts are easily and quickly renewable.

Other objects and advantages will be made evident hereinafter.

Referring to the drawing which is for illustrated purposes only,

Fig. 1 is a vertical sectional view through a gas trap having a valve of my invention mounted upon the outlet pipe thereof to control the outflow of oil from the gas trap.

Fig. 2 is a fragmentary section taken substantially upon a plane represented by the line 2—2 of Fig. 1.

Fig. 3 is a vertical section through the valve shown in Fig. 1 and taken upon the plane indicated by the line 3—3 of Fig. 2.

Fig. 4 is a section taken on the plane represented by the line 4—4 of Fig. 3.

Fig. 5 is a section taken on a plane represented by the line 5—5 of Fig. 4.

The gas trap 11 shown in Fig. 1, with which I illustrate the utility of my invention, consists of a substantially cylindrical shell 12 having a sediment drain 16 at the bottom thereof. The combined flow of oil and gas from the producing well is directed through an inlet 13, the oil and gas mixture flowing downwardly over a conical hood 14 into a chamber 15 in which the oil and gas separate, the gas making exit through the gas outlet pipe 18 situated in the top of the gas trap 11 and the oil being drawn off through a downwardly directed pipe 19 which is connected with the flow regulating valve 20 in which are embodied the features of my invention.

The pressure under which the oil and gas enters the gas trap 11 ranges at different periods from several pounds to as high as 250 pounds, which high pressure occurs during periods of surge. The position in which the float 21 is shown in the illustration is that existing under the conditions of an ordinary flow of oil through the gas trap.

Through an adjustable link 22 connecting between the valve operating lever 23 and an arm 24 mounted upon a shaft 25 which also mounts the float arm 26, the valve 20 is maintained partially opened so that the amount of oil flowing out through the discharge pipe 19 is substantially equal to the amount of oil entering through the inlet 13. When a surge or an increase in the entering oil occurs, the level 27 of the oil within the chamber 15 will be raised, lifting with it the float 21 and causing a downward movement of the arm 24 which accomplishes through the link 22 a corresponding downward movement of the arm 23 and the valve is opened to a greater extent to accommodate an increased outflow of oil to care for the increase in the amount of oil entering into the chamber 15. Also a decrease in the amount of oil flowing into the chamber 15 causes a drop in the level 26 and a corresponding drop in the float with the result that the valve opening is further constricted to restrict the outflow of oil and to maintain a level of oil above the pipe 19 so that no gas is allowed to pass out of the trap through the pipe 19 but must make its exit through the gas outlet piping 18.

In the remaining Figs. 3, 4 and 5 of the drawing I illustrate the construction of the valve 20. A body 30 providing a recess 31 therein is covered by a plate 32 having an opening 33 extending therethrough, said body being suitably threaded at 34 to allow the connection thereto of the piping 35 shown in Figs. 1 and 2. Entrance into the valve chamber formed by the recess 31 is provided through an opening 36 threaded to receive a nipple 37 connecting by means of a sleeve 38 with the outlet pipe 19. Extending through a packing member 40 in the side of the body 30 is a shaft 41 having the inner end 42 thereof seated in a recessed lug 43. Upon the shaft 41 I secure by means of a bolt 39 a member 44 having a gear segment 45 formed thereupon, the teeth of which segment engage with racks 46 formed upon a closure plate 47 which rests against the inner face 48 of the cover plate 32 and is adapted to be moved across the opening of the outlet passage 33 to prevent the passage of liquid therethrough. A pair of leaf springs 50 operate against slides 51 formed upon each side of the racks 46 and serve to hold the closure plate 47 against the face 48 of the plate 32 and also serve as a guide means for the closure plate 47.

The formation of gear teeth I employ is what is known as the herringbone, and as shown in Fig. 5 I form a vertical channel 60 centrally between the racks 46.

It will be perceived that as the segment is revolved in clockwise direction, the tendency of the teeth of the segment 45 in engaging with the rack 46 is to force whatever foreign matter may be collected between the teeth of the rack 46 toward the channel 60 thus making the gearing arrangement self-clearing of matter that would otherwise interfere with the perfect action of the gears. This clearing action of the gears is assisted by the flow of oil downwardly over the face of the rack.

The manner in which I construct this valve provides for very economical and sturdy construction as the machine work necessary is of the very simplest type, there being few internal faces to be machined.

The plate 32 and the closure plate 47, as will be seen from the illustrations, are of the very simplest construction and when worn can be easily and cheaply replaced. The pressure of the oil passing through the valve 20 exerts a pressure against the plate 47 in the direction of the arrow 65 which holds the plate firmly against the surface 48 of the plate 32 and as the pressure of the oil increases the force upon the plate 47 causes it to be held still more firmly in a position of closure.

It will also be seen that the flow of oil passes below the operating mechanism, and being of such direct flow does not cause a deposit of abrasive and encumbering substances at points where they would interfere with the operation of the valve and cause excessive wear of the frictional parts thereof.

I claim as my invention:

In a sliding plate valve, the combination of: a valve body having an inlet and an outlet, and provided with a valve seat surrounding said outlet; a vertically slidable valve plate normally closing said outlet and having a rack formed on the medial portion of its inner surface; a gear engaging said rack; means for rotating the gear to translate the valve plate; and a pair of leaf springs maintaining the valve plate against its seat, the respective springs engaging the valve plate on opposite sides of and closely adjacent the rack to form a guide means preventing substantial transverse displacement of the valve plate.

In testimony whereof, I have hereunto set my hand at Los Angeles, California, this 17 day of October 1921.

MILON J. TRUMBLE